(12) United States Patent
Alexander et al.

(10) Patent No.: US 7,882,338 B2
(45) Date of Patent: Feb. 1, 2011

(54) METHOD, SYSTEM AND COMPUTER PROGRAM PRODUCT FOR AN IMPLICIT PREDICTED RETURN FROM A PREDICTED SUBROUTINE

(75) Inventors: Khary J. Alexander, Poughkeepsie, NY (US); James J. Bonanno, Wappingers Falls, NY (US); Brian R. Prasky, Wappingers Falls, NY (US); Anthony Saporito, III, Highland, NY (US); Robert J. Sonnelitter, III, Wappingers Falls, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 12/034,066

(22) Filed: Feb. 20, 2008

(65) Prior Publication Data
US 2009/0210661 A1 Aug. 20, 2009

(51) Int. Cl.
*G06F 9/32* (2006.01)
(52) U.S. Cl. .................................... 712/242
(58) Field of Classification Search ................. None
See application file for complete search history.

(56) References Cited

U.S. PATENT DOCUMENTS

| | | | |
|---|---|---|---|
| 5,193,156 A | 3/1993 | Yoshida et al. | |
| 5,276,882 A * | 1/1994 | Emma et al. | 712/240 |
| 5,867,696 A | 2/1999 | Okayama et al. | |
| 5,974,543 A * | 10/1999 | Hilgendorf et al. | 712/240 |
| 6,170,054 B1 | 1/2001 | Poplingher | |
| 6,289,444 B1 * | 9/2001 | Nair | 712/243 |
| 6,530,016 B1 * | 3/2003 | Ukai et al. | 712/237 |
| 6,829,702 B1 * | 12/2004 | Jeremiah et al. | 712/241 |
| 6,851,046 B1 * | 2/2005 | Delvaux et al. | 712/236 |
| 7,386,709 B2 * | 6/2008 | Vasekin | 712/242 |
| 7,707,396 B2 * | 4/2010 | Bradford et al. | 712/238 |
| 2003/0212882 A1 * | 11/2003 | Bonanno et al. | 712/238 |
| 2004/0015683 A1 * | 1/2004 | Emma et al. | 712/240 |
| 2005/0076193 A1 * | 4/2005 | Henry et al. | 712/238 |
| 2005/0216713 A1 * | 9/2005 | Prasky et al. | 712/238 |
| 2006/0149951 A1 * | 7/2006 | Abernathy et al. | 712/240 |

OTHER PUBLICATIONS

Levitan, D. etal., The PowerPC 620 MIcroprocessor: A High Performance Superscalar RISC Microprocessor, 1995, IEEE,pp. 285-291.*
z/Architecture, Principles of Operation, Sixth Edition, Apr. 2007, Publication No. SA22-7832-05, copyright IBM Corp. 1990-2007, pp. 1-1218.

* cited by examiner

*Primary Examiner*—Eric Coleman
(74) *Attorney, Agent, or Firm*—Cantor Colburn LLP; John Campbell

(57) ABSTRACT

A method, system and computer program product for performing an implicit predicted return from a predicted subroutine are provided. The system includes a branch history table/branch target buffer (BHT/BTB) to hold branch information, including a target address of a predicted subroutine and a branch type. The system also includes instruction buffers, and instruction fetch controls to perform a method including fetching a branch instruction at a branch address and a return-point instruction. The method also includes receiving the target address and the branch type, and fetching a fixed number of instructions in response to the branch type. The method further includes referencing the return-point instruction within the instruction buffers such that the return-point instruction is available upon completing the fetching of the fixed number of instructions absent a re-fetch of the return-point instruction.

20 Claims, 4 Drawing Sheets

BHT/BTB 108

| Branch Address | Target Address | Branch Type | Length |
|---|---|---|---|
| ... | ... | ... | ... |
| A+8 | B | FL | 2 |
| ... | ... | ... | ... |
| A+24 | C | S | — |
| ... | ... | ... | ... |
| C+24 | A+32 | S | — |

METHOD, SYSTEM AND COMPUTER PROGRAM PRODUCT FOR AN IMPLICIT PREDICTED RETURN FROM A PREDICTED SUBROUTINE

BACKGROUND OF THE INVENTION

This invention relates generally to branch prediction in a computer system, and more particularly to detecting and executing an implicit predicted return from a predicted subroutine in a processor.

Computer programs frequently contain subroutines that are used to perform specific tasks within the program. Such subroutines are used to enable the reuse of code in a program and reduce code duplication. When a program is executing as a stream of instructions in a microprocessor, subroutines are typically handled by a branch instruction in the instruction stream to the start of a subroutine. The processor then executes the instructions in the subroutine, and at its conclusion, the subroutine contains another branch instruction to return to the sequential instruction of its caller. Since subroutines are frequently used in computer programs, optimizing this sequence can boost the performance of a program.

Modern high performance microprocessors contain logic that maintains a direction history of recently encountered branch instructions known as a branch history table (BHT). Many processors also contain a branch target buffer (BTB), which stores branch address and target address bits associated with a given branch. This mechanism can be used to enhance the performance of executing subroutines by predicting in advance when a branch to a subroutine will occur, and predicting to where it will return. However, this mechanism does have some limitations. First, it requires two entries in the BHT/BTB, one for the branch instruction to the subroutine and one for the return from the subroutine. Second, since subroutines are often called from many locations in a program, it may frequently be the case that the return address contained in the BHT/BTB for a subroutine is incorrect, as it points to a previous time a subroutine was executed by a different portion of the program.

Therefore, it would be beneficial to improve the handling of subroutines by reducing the number of entries in the BHT/BTB and improving the accuracy of the subroutine's predicted return address. Accordingly, there is a need in the art for providing an implicit predicted return from a predicted subroutine in a processor.

BRIEF SUMMARY OF THE INVENTION

An exemplary embodiment includes a system for performing an implicit predicted return from a predicted subroutine in a processor. The system includes a branch history table/branch target buffer (BHT/BTB) to hold branch information. The branch information includes a target address of a predicted subroutine and a branch type. The system also includes instruction buffers to buffer fetched instructions, and instruction fetch controls (IFC) to perform a method. The method includes fetching a branch instruction at a branch address and a return-point instruction at an address subsequent to the branch address. The method also includes receiving the target address of the predicted subroutine and the branch type associated with the branch address via the BHT/BTB. The method additionally includes fetching a fixed number of instructions starting at the target address of the predicted subroutine in response to the branch type indicating that the predicted subroutine is a fixed-length subroutine. The method further includes referencing the return-point instruction within the instruction buffers such that the return-point instruction is available upon completing the fetching of the fixed number of instructions absent a re-fetch of the return-point instruction.

Another exemplary embodiment includes a method for performing an implicit predicted return from a predicted subroutine in a processor. The method includes fetching a branch instruction at a branch address and a return-point instruction at an address subsequent to the branch address. The method further includes searching a BHT/BTB to locate the branch address, where the BHT/BTB holds branch information including a target address of a predicted subroutine and a branch type. The method also includes fetching a fixed number of instructions starting at the target address of the predicted subroutine in response to the branch type indicating that the predicted subroutine is a fixed-length subroutine. The method additionally includes referencing the return-point instruction such that the return-point instruction is available upon completing the fetching of the fixed number of instructions absent a re-fetch of the return-point instruction.

A further exemplary embodiment includes a computer program product for performing an implicit predicted return from a predicted subroutine in a processor. The computer program product includes a computer-readable storage medium for storing instructions including an implicit predicted return from a predicted subroutine. The method includes calling a fixed-length subroutine via a branch instruction at a branch address, where the fixed-length subroutine is predictively fetched as a predicted subroutine. The method further includes returning to an address subsequent to the branch address absent a return branch instruction in the predicted subroutine upon predictively fetching a fixed number of instructions in the predicted subroutine.

BRIEF DESCRIPTION OF THE DRAWINGS

Referring now to the drawings wherein like elements are numbered alike in the several FIGURES:

FIG. 2 depicts contents of a BHT/BTB in accordance with an exemplary embodiment;

DETAILED DESCRIPTION OF EXEMPLARY EMBODIMENTS

An exemplary embodiment of the present invention performs an implicit predicted return from a predicted subroutine in a processor. The processor contains a branch history table (BHT) of previously encountered branches in an instruction stream. The BHT stores the direction (taken versus not-taken) of a branch when it was executed previously. The processor also includes a branch target buffer (BTB) to additionally track a target address of the branch. Instruction fetch controls (IFC) in the processor can use the information in the BTB to predict the stream of instructions that will be executed. When an instruction is predicted by the BHT/BTB as a taken branch, the IFC begins fetching the instructions at the target location of the branch and continues fetching until another branch is encountered by the BTB. In an exemplary embodiment, additional state information is stored in the BHT/BTB to indicate if a branch's target is a fixed-length subroutine. The BHT/BTB may also include a field indicating the length of the fixed-length subroutine or the length may be implicitly defined as a function of the branch type. The length can be in terms of a number of instruction or a number of bytes, for instance to support variable length instructions. When a branch including fixed-length information (also referred to as a fixed-length branch instruction) is encountered, the IFC fetches the target of the branch, but only for the length indicated by the BHT/BTB. With the length indication, the BHT/BTB is implying that upon executing the specified number of instructions, the subroutine will return to the sequential instruction after the fixed-length branch (i.e., a return-point instruction). This saves a BHT entry by eliminating the subroutine's return branch in addition to removing additional fetching of the return-point instruction. The additional fetching can be removed since it was part of the sequential fetching prior to fetching the subroutine. Furthermore, upon going into the subroutine, this sequential content beyond the subroutine caller is buffered so as to have it available upon encountering the subroutine return. Since the subroutine returns to the sequential instruction of the caller (referred to as the return-point instruction), it also allows the subroutine to be called from many places in the code, and thus have many different return-point instruction targets, with high prediction accuracy for its return address being the sequential address to that of the fixed-length branch.

Figure 1:
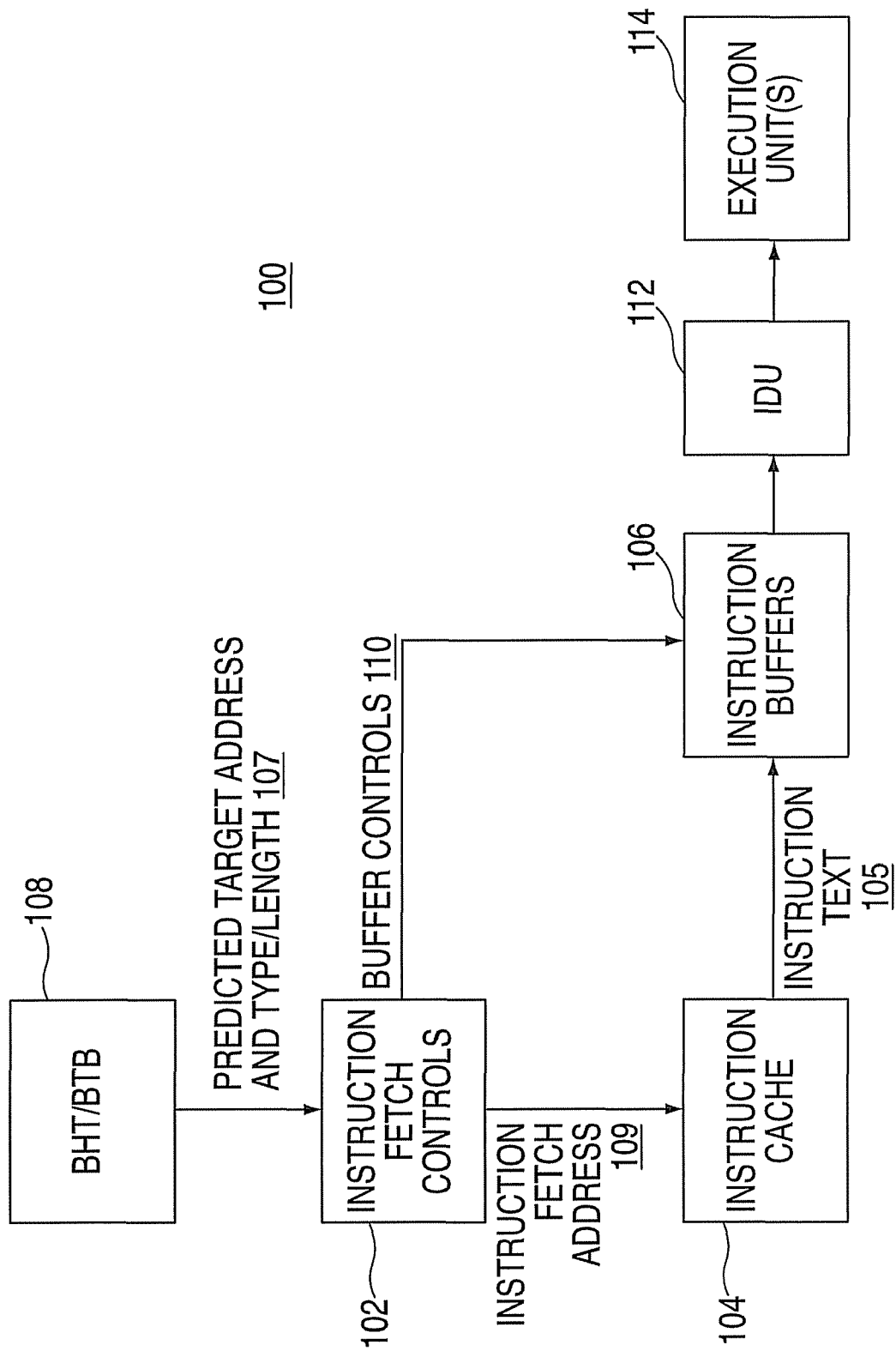
FIG. 1 depicts a block diagram of a system in a processor upon which an implicit predicted return from a predicted subroutine may be performed in an exemplary embodiment.

Turning now to the drawings in greater detail, it will be seen that in FIG. 1 a block diagram of a system 100 in a processor upon which an implicit predicted return from a predicted subroutine may be performed is depicted in accordance with an exemplary embodiment. The system 100 includes an instruction fetch controls (IFC) 102 that acquires instructions from an instruction cache 104, passing instruction text 105 to instruction buffers 106.

To increase efficiency in the system 100, branch prediction may be performed. In support of branch prediction, the IFC 102 utilizes BHT/BTB 108. When the BHT/BTB 108 finds a new predicted branch, it presents to the IFC 102 the branch's target address as well as part of branch information 107, which can also include other information, such as branch taken/not taken status. The BHT/BTB 108 also provides as part of the branch information 107 an indication as to whether the branch is of a fixed-length type. The BHT/BTB 108 may either explicitly provide the length for the branch, or the length may be implicitly defined as a function of the branch type definition. For example, the fixed-length branch type may always be a single instruction, i.e., length of one. Moreover, the length can be defined as a number of instructions or a number of bytes of instructions. Here, the term "byte" can refer to any number of bits and is not limited to 8 bits.

The IFC 102 sends a fetch for the target address as instruction fetch address 109 to the instruction cache 104, which in turn sends the instruction text 105 to the instruction buffers 106. In addition to initiating the fetch, the IFC 102 also provides the instruction buffers 106 with buffer controls 110, indicating that the fetch is for the target of a fixed-length branch, so that the instruction buffers 106 can buffer the instruction text 105 without losing any other previously fetched instruction text. The instruction buffers 106 provide instructions to an instruction decode unit (IDU) 112. The IDU 112 passes the instructions in an instruction stream to one or more execution units 114. The execution units 114 may support multiple paths for instruction execution, e.g., a superscalar architecture. When a fixed-length branch instruction is delivered to the IDU 112, the instruction buffers 106 send the correct number of instructions in the fixed-length subroutine to the IDU 112 using the length information extracted from the buffer controls 110. The instruction buffers 106 then resume sending the instructions that sequentially follow the fixed-length branch. Prior to encountering the fixed-length branch instruction, the instruction buffers 106 may have already received a return-point instruction from an address subsequent to the address of the fixed-length branch instruction. If the fixed-length subroutine does not change its return address, then the buffered return-point instruction already available in the instruction buffers 106, avoiding re-fetching upon returning from the fixed-length subroutine.

FIG. 2 depicts contents of the BHT/BTB 108 of FIG. 1 in accordance with an exemplary embodiment. The BHT/BTB 108 includes multiple fields for a branch address 202, a target address 204, a branch type 206, and optionally a length field 208. Although only a limited number of fields 202-208 are depicted in the BHT/BTB 108, it will be understood that the BHT/BTB 108 can include other fields and access control logic known in the art. The actual values stored in the BHT/BTB 108 for branch addresses and target addresses, e.g., branch address 202 and target address 204, may be address segments sufficient to identify specific addresses. Furthermore, the fields 202-208 can be further divided between a separate BHT and BTB, collectively referred to as the BHT/BTB 108. In an exemplary embodiment, when a search of the BHT/BTB 108 is performed for branch prediction, the branch address 202 is located and the corresponding target address 204 is selected and returned to the IFC 102 of FIG. 1. The BHT/BTB 108 also returns the branch type 206 to indicate whether the branch is of a fixed-length type. The length field 208 can be employed to indicate the number of instructions (or number of bytes) until the end of the fixed-length subroutine associated with the target address 204. Restricting the size of the length field 208 may improve efficiency in space allocation for the BHT/BTB 108 while also limiting the use of fixed-size subroutines to a relatively small size, e.g., 2 bits for a 4 instruction maximum, 4 bits for a 16 instruction maximum, 8 bits for a 256 instruction maximum, etc.

Figure 3:
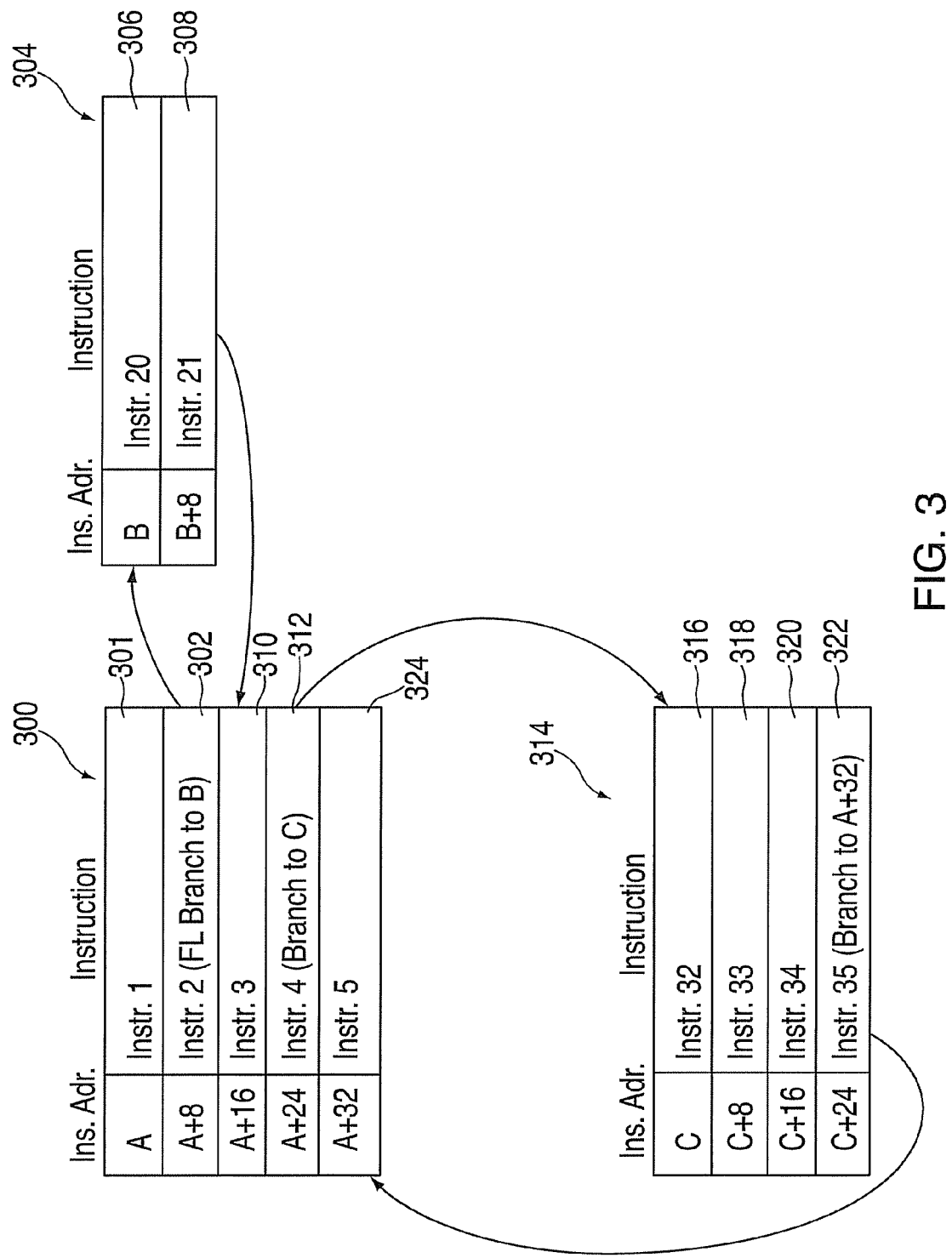
FIG. 3 depicts an exemplary flow of instructions including a branch to and return from a fixed length subroutine.

The BHT/BTB 108, as depicted in FIG. 2, includes specific example values, which are described in greater detail in reference to FIG. 3. An example of an instruction sequence 300 is depicted in FIG. 3 to further illustrate the use of a fixed-length branch versus a standard branch. The IFC 102 of FIG. 1 advances from fetching instruction 1 301 to instruction 2 302, with a branch instruction included as instruction 2 302. The IFC 102 may be unable to determine that the instruction 2 302 is a branch instruction, as instruction decoding is not performed until reaching the IDU 112 of FIG. 1. The BHT/BTB 108 assists in predicting whether a branch has been encountered and how to proceed for subsequent fetching. The BHT/BTB 108 searches and locates branch address 210 as address A+8 and a target address 212 as address B that points to a fixed-length subroutine 304. The BHT/BTB 108 also provides a branch type 214 to the IFC 102 of FIG. 1 to indicate that the branch instruction at instruction 2 302 is a fixed-length type. Additionally, the BHT/BTB 108 can notify the IFC 102 and the instruction buffers 106 that length field 216 has a value of two, indicating that the fixed-length subroutine 304 only includes two instructions, instruction 20 306 and instruction 21 308. Instruction 21 308 does not include a branch instruction, as the branch type 214 and length field 216 provide sufficient information to the IFC 102 to fetch instruction 3 310 following instruction 21 308 (i.e., a return-point instruction subsequent to the instruction that called fixed-length subroutine 304). The IFC 102 may have already fetched the instruction 21 308 and stored it to the instruction buffers 106 since it was the next sequential instruction following the branch. This allows the return-point instruction to be available upon completing the fetch of the fixed-length subroutine 304 without re-fetching, which improves instruction processing efficiency.

As the IFC 102 of FIG. 1 continues to fetch instructions, fetching advances from instruction 3 310 to instruction 4 312 with a branch to address C. Again, the BHT/BTB 108 assists the IFC 102 with branch prediction. The BHT/BTB 108 searches and locates branch address 218 as address A+24 and a target address 220 as address C that points to a standard subroutine 314. Branch type 222 associated with the target address 220 indicates that subroutine 314 is of a standard, variable length, type and as such, the value in optional length field 224 is a "don't care". The IFC 102 continues to fetch instructions in the standard subroutine 314, fetching instruction 32 316, instruction 33 318, and instruction 34 320. As fetching advances from instruction 34 320 to instruction 35 322 with a standard branch to address A+32, the BHT/BTB 108 searches and locates branch address 226 as address C+24 and a target address 228 as address A+32 that points to instruction 5 324. Branch type 230 associated with the target address 228 indicates that the branch is of a standard variable length type and as such, the value in optional length field 232 is a "don't care". Thus, it can be seen that the standard subroutine 314 requires a pair of rows in the BHT/BTB 108 to support an entry branch and a return branch, while the fixed-length subroutine 304 only uses a single row in the BHT/BTB 108. It will also be understood that the addresses, offsets, and instruction numbering in FIGS. 2 and 3 are for explanatory purposes and are not to be construed as limiting in scope, as varying instruction lengths and numerous subroutines can be supported. For example, nested subroutine calls may be supported within the scope of the invention.

Figure 4:
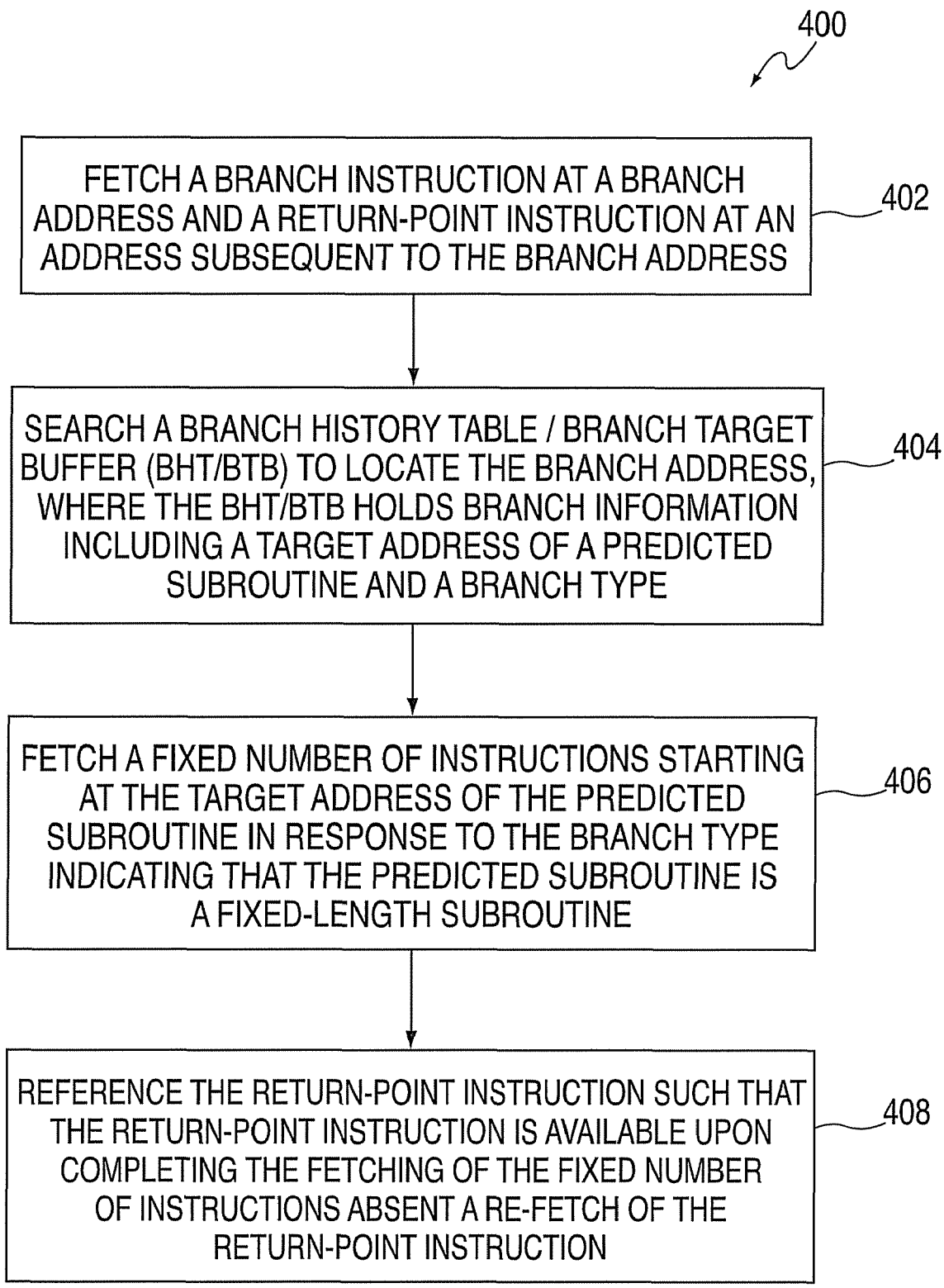
FIG. 4 depicts a process for performing an implicit predicted return from a predicted subroutine in accordance with an exemplary embodiment.

Turning now to FIG. 4, a process 400 for performing an implicit predicted return from a predicted subroutine in a processor will now be described in reference to FIGS. 1-3, and in accordance with an exemplary embodiment. At block 402, the IFC 102 fetches instructions from the instruction cache 104, which may include a branch instruction at branch address 202 and a return-point instruction at an address subsequent to the branch address 202. For example, the branch instruction can be instruction 2 302 and the return-point instruction is instruction 3 310.

At block 404, the BHT/BTB 108 is searched to locate branch address 202. The BHT/BTB 108 holds branch information including a target address 204 of a predicted subroutine and a branch type 206 associated with the branch address 202. The branch information is returned to the IFC 102.

At block 406, the IFC 102 fetches a fixed number of instructions starting at the target address 204 of the predicted subroutine in response to the branch type 206 indicating that the predicted subroutine is a fixed-length subroutine. The fixed number of instructions may be defined implicitly as a function of the branch type 206. For example, the branch type 206 can be enumerated into multiple types, e.g., FL__1=1 instruction, FL__2=2 instructions, and so forth. Alternatively, the branch information can include length field 208 that specifies the fixed number of instructions or bytes.

At block 408, the IFC 102 references the return-point instruction within the instruction buffers 106 such that the return-point instruction is available upon completing the fetching of the fixed number of instructions absent a re-fetch of the return-point instruction. This provides an implicit return without requiring a branch instruction at the end of the subroutine, which may otherwise be included in a standard subroutine. Since the return-point instruction is already fetched in this example, processing of instructions can proceed seamlessly. As previously described in reference to FIG. 3, fetching of instruction 2 302 and instruction 3 310 may be followed by fetches of instruction 20 306, instruction 21 308, with the order of instructions sent to the IDU 112 maintained as instruction 2 302, 20 306, 21 308 and 3 310 even though an explicit branch instruction is absent from the instruction 21 308.

It will be understood that the process 400 can be applied to any processing circuitry that incorporates a processor pipeline. For example, the process 400 can be applied to various digital designs, such as a microprocessor, an application specific integrated circuit (ASIC), a programmable logic device (PLD), or other such digital devices capable of processing instructions. Therefore, the system 100 of FIG. 1 can represent a variety of digital designs that incorporate processing circuitry, referred to collectively as processors.

Technical effects and benefits include reducing the number of instructions and branches required for fixed length subroutines. Adding support to a BHT/BTB to identify a branch type as a fixed length type allows the processor to predicatively fetch a fixed number of instructions such that they can be inserted into the instruction stream for efficient processing. The fixed number of instructions also removes the need for an explicit branch instruction at the end of a fixed length subroutine, which also reduces the number of entries in the BHT/BTB. Buffering the return-point instruction enables continued processing following the implicit return without re-fetching the return-point instruction.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for performing an implicit predicted return from a predicted subroutine in a processor, the system comprising:

a branch history table/branch target buffer (BHT/BTB) to hold branch information, wherein the branch information includes a target address of a predicted subroutine and a branch type;

instruction buffers to buffer fetched instructions; and instruction fetch controls (IFC) for performing a method comprising:

fetching a branch instruction at a branch address and a return-point instruction at an address subsequent to the branch address;

receiving the target address of the predicted subroutine and the branch type associated with the branch address via the BHT/BTB;

fetching a fixed number of instructions starting at the target address of the predicted subroutine in response to the branch type indicating that the predicted subroutine is a fixed-length subroutine; and referencing the return-point instruction within the instruction buffers such that the return-point instruction is available upon completing the fetching of the fixed number of instructions absent a re-fetch of the return-point instruction: and wherein the fixed-length subroutine is associated with only a single row in the BHT/BTB.

2. The system of claim 1 wherein the branch information further comprises a length field that specifies the fixed number of instructions as a number of instructions or as a number of bytes.

3. The system of claim 1 wherein the branch type defines the fixed number of instructions.

4. The system of claim 1 wherein the instruction buffers to send the fixed number of instructions to an instruction decode unit (IDU) between the instructions at the branch address and at the address subsequent to the branch address.

5. The system of claim 1 wherein the IFC provides buffer controls to the instruction buffers.

6. The system of claim 1 wherein a standard subroutine is associated with at least two rows in the BHT/BTB.

7. The system of claim 1 wherein the BHT/BTB is searched relative to the branch address to locate the target address of the predicted subroutine and the branch type.

8. A method for performing an implicit predicted return from a predicted subroutine in a processor, the method comprising:

fetching a branch instruction at a branch address and a return-point instruction at an address subsequent to the branch address;

searching a branch history table/branch target buffer (BHT/BTB) to locate the branch address, wherein the BHT/BTB holds branch information including a target address of a predicted subroutine and a branch type;

fetching a fixed number of instructions starting at the target address of the predicted subroutine in response to the branch type indicating that the predicted subroutine is a fixed-length subroutine; and referencing the return-point instruction such that the return-point instruction is available upon completing the fetching of the fixed number of instructions absent a re-fetch of the return-point instruction; and wherein the fixed-length subroutine is associated with only a single row in the BHT/BTB.

9. The method of claim 8 wherein the branch information further comprises a length field that specifies the fixed number of instructions as a number of instructions or as a number of bytes.

10. The method of claim 8 wherein the branch type defines the fixed number of instructions.

11. The method of claim 8 further comprising:

sending the fixed number of instructions to an instruction decode unit (IDU) between the instructions at the branch address and at the address subsequent to the branch address.

12. The method of claim 8 wherein a standard subroutine is associated with at least two rows in the BHT/BTB.

13. The method of claim 8 wherein the fetching is performed by instruction fetch controls (IFC) and the instructions are buffered in instruction buffers.

14. A computer program product for performing an implicit predicted return from a predicted subroutine in a processor, the computer program product comprising:

a computer-readable storage medium for storing instructions including an implicit predicted return from a predicted subroutine, comprising a method of:

calling a fixed-length subroutine via a branch instruction at a branch address, wherein the fixed-length subroutine is predictively fetched as a predicted subroutine; and returning to an address subsequent to the branch address absent a return branch instruction in the predicted subroutine upon predictively fetching a fixed number of instructions in the predicted subroutine; and wherein the fixed-length subroutine is associated with only a single row in the BHT/BTB.

15. The computer program product of claim 14 wherein predictively fetching the fixed number of instructions further comprises:

searching a branch history table/branch target buffer (BHT/BTB) to locate the branch address, wherein the BHT/BTB holds branch information including a target address of the predicted subroutine and a branch type; and fetching the fixed number of instructions starting at the target address of the predicted subroutine in response to the branch type indicating that the predicted subroutine is of a fixed-length.

16. The computer program product of claim 15 wherein the branch information further comprises a length field that specifies the fixed number of instructions as a number of instructions or as a number of bytes.

17. The computer program product of claim 15 wherein the branch type defines the fixed number of instructions.

18. The computer program product of claim 15 wherein a standard subroutine is associated with at least two rows in the BHT/BTB.

19. The computer program product of claim 15 wherein the fetching is performed by instruction fetch controls (IFC) and the instructions are buffered in instruction buffers.

20. The computer program product of claim 14 wherein the fixed number of instructions are sent to an instruction decode unit (IDU) between the instructions at the branch address and at the address subsequent to the branch address.

* * * * *